United States Patent [19]

Clark et al.

[11] 3,914,375

[45] Oct. 21, 1975

[54] METHOD OF REMOVING SELENIUM FROM COPPER SOLUTION

[75] Inventors: Franklin F. Clark, Golden; Robert S. Rickard, Lakewood, both of Colo.

[73] Assignee: Amax Inc., New York, N.Y.

[22] Filed: Apr. 8, 1974

[21] Appl. No.: 459,041

[52] U.S. Cl. ............... 423/43; 423/509; 204/108; 75/108; 75/121
[51] Int. Cl.² .. C01G 3/00; C01G 5/00; C01G 7/00; C22B 11/00
[58] Field of Search ............ 423/509, 510, 508, 34, 423/36, 41, 42, 43; 75/108, 121; 204/108

[56] References Cited
UNITED STATES PATENTS

| | | | |
|---|---|---|---|
| 1,598,296 | 10/1926 | MacKay | 204/108 |
| 3,026,175 | 3/1962 | Kulifry | 423/509 |

OTHER PUBLICATIONS

Schloen, J. H., et al., "Treatment of Electrolytic Copper Refinery Slimes," *Journal of Metals*, Transacting AIME, (188), pp. 764–767.

*Primary Examiner*—Oscar R. Vertiz
*Assistant Examiner*—Michael L. Lewis
*Attorney, Agent, or Firm*—Kasper T. Serijan; Eugene J. Kalil

[57] ABSTRACT

Selenium is separated from a copper solution by reduction with $SO_2$ at a temperature of about 110° C to 170° C and a pressure ranging from about 10 to 100 psi gage whereby a precipitate of $Cu_2Se$ is formed mixed with some copper powder. A slurry of $Cu_2Se$ and copper is then formed in an aqueous solution containing free sulfate ions and some copper sulfate and the slurry aerated to effect the selective dissolution of the copper powder, leaving said $Cu_2Se$ precipitate as a residue which is then separated by filtration from the dissolved copper.

4 Claims, No Drawings

METHOD OF REMOVING SELENIUM FROM COPPER SOLUTION

This invention relates to a method for separating selenium from copper-containing acid solutions, wherein the selenium is removed as a precipitate comprising $Cu_2Se$ mixed with copper powder, the $Cu_2Se$ being thereafter separated from copper powder by the selective dissolution of said copper powder.

STATE OF THE ART

It is known to leach copper-nickel matte in two stages wherein the finely ground matte is formed as a slurry with a sulfuric acid solution and a substantial portion of the nickel selectively leached from the matte in a hot solution of said acid under oxidizing conditions to provide a solution containing a major portion of the nickel and a low concentration of copper. The residue which contains the bulk of the copper and impurities is then pressure leached with a sulfuric acid at an elevated temperature in an autoclave in order to dissolve the copper. Impurities, such as Fe, As, Bi, Se, etc. are also dissolved.

In order to prepare the solution for the electrolytic recovery of copper, the foregoing impurities must be removed. The impurities arsenic, bismuth, selenium, and the like, adversely affect electrical conductivity properties of copper and should be avoided as much as possible.

It is relatively easy to remove iron and other impurities, except selenium. For example, in order to remove iron, the high pressure leach solution, which has a pH in the order of about 0.9, is subjected to an acidneutralizing step comprising adding an alkaline substance, such as $CaCO_3$, $NH_4OH$, etc., to bring the pH up to 3.5. The solution is aerated to assure an oxidizing condition and iron precipitated out as $Fe(OH)_3$. This precipitation step also removes bismuth and arsenic, among other impurities, but not selenium. Selenium, as stated herein, is anathema to the properties of copper and must also be removed from solution.

It is known to precipitate selenium from sulfuric acid solutions at ordinary atmospheric pressure using $SO_2$ gas as the precipitant. However, this method is not sufficient to remove substantially all of the selenium quantitatively. It is important to remove all of the selenium to assure electrolytic copper having requisite properties, such as electrical conductivity.

OBJECTS OF THE INVENTION

It is thus the object of the invention to provide a method for the removal of selenium from copper-containing sulfuric acid solutions.

Another object is to provide a method for separating selenium from copper-containing sulfuric acid solutions which contain other impurities, such as iron, bismuth, and arsenic, wherein the latter impurities are removed first and the selenium remaining thereafter removed by high pressure precipitation with $SO_2$.

These and other objects will more clearly appear from the following disclosure and the appended claims.

STATEMENT OF THE INVENTION

Stating it broadly, a method is provided for treating a copper-containing sulfuric acid solution to remove impurities therefrom in order to prepare the solution for the electrolytic recovery of copper therefrom. The solution containing iron, selenium and at least one other impurity capable of being precipitated with the iron, e.g. arsenic and bismuth, generally has a pH of less than 1. Thus, in precipitating iron and, with it, such impurities as arsenic, bismuth, and the like, the method comprises adjusting the pH to a level of at least 3 (e.g. about 3 to 4.5) and aerating said solution to precipitate the iron as $Fe(OH)_3$ and at least said one other impurity, the selenium staying in solution. The additional steps include filtering the precipitated impurities from the solution and then subjecting the solution to pressure reduction with $SO_2$ at a temperature of about 110° C to 170° C at a pressure of about 10 to 100 psi gage to remove selenium as $Cu_2Se$ together with some copper in the form of copper powder. The removal of selenium as $Cu_2Se$ together with metallic copper is indicative of an exceptionally good separation of the selenium from the copper in solution.

Following the precipitation of the $Cu_2Se$-Cu mixture, the copper is selectively dissolved in the presence of sulfate ions and copper sulfate in an aqueous solution while aerating said solution, wherein the residue of this dissolution comprises essentially said $Cu_2Se$, the copper being converted to copper sulfate. Preferably, the copper sulfate solution is combined with the purified copper acid solution.

DETAILS OF THE INVENTION

As illustrative of the invention, the following example is given:

EXAMPLE 1

A copper-nickel sulfide matte containing by weight 50.5% Ni, 28.1% Cu, 0.6% Co, 2.0% Fe and the balance substantially sulfur, e.g. 18% to 18.8%, and small amounts of impurities, such as Se, As, Bi and the like, is melted and granulated in a heavy stream of water. The granulated matte is wet-ground in a ball mill to a nominal size of 270-mesh, using hydroclones to close the mill circuit.

The matte is leached with sulfuric acid and/or spent copper electrolyte (pH about 0.5) at a temperature of about 160° F to 180° F (71° C to 82° C), the pH rising to about 5.5, with iron precipitating from solution. The nickel is substantially selectively leached from the matte, the leach liquor being then separated from the residue for nickel recovery.

A typical nominal composition of the residue is 28% Ni, 46% Cu, 0.8% Co, 2.4% Fe, 22% S and the balance impurities.

The residue is subjected to high pressure-high temperature leach in the presence of air or oxygen in an autoclave in a sulfuric acid solution of below 3 pH at a temperature within the range of about 275° F to 750° F (135° C to 400° C) such that the sulfide material is converted to the soluble sulfate which is immediately taken up into solution to form a pregnant liquor.

The pregnant liquor is separated from the residue and the liquor then treated for the removal of such impurities as Fe, As, Bi, Se, etc. to prepare the liquor for the recovery of copper by electrolysis. The pregnant liquor which generally has a pH of about 0.1 or below is treated with a neutralizing agent, such as $CaCO_3$, $MgCO_3$ or ammonium hydroxide to raise the pH to about 3.5 to precipitate the iron and any arsenic and bismuth present, the selenium staying in solution, the amount of selenium being about 10 to 20 parts per million (ppm).

The filtrate is then subjected to pressure reduction at said pH of 3.5 with $SO_2$ at about 170° C at a pressure of about 95 psi gage whereby a precipitate is produced comprising a mixture of $Cu_2Se$ and copper powder.

The precipitate is separated from the solution by settling or filtration.

To the $Cu_2Se$-Cu precipitate is added a copper sulfate solution and sufficient sulfuric acid at least stoichiometrically equivalent to the copper in the precipitate to yield a slurry having a pulp density of about 10%. This solution is then subjected to oxidation with air or oxygen by bubbling the gas through said solution maintained at a temperature of about 85° C, whereby the copper powder is oxidized and dissolved to form soluble copper sulfate, leaving $Cu_2Se$ as a residue. This solution containing copper sulfate is combined with the previously purified copper sulfate solution and sent to copper recovery (electrolytic recovery).

EXAMPLE 2

An impure copper sulfate acid solution is treated in accordance with the invention, the solution containing: 40.8 grams per liter (gpl) copper (Cu), 43.4 gpl nickel (Ni), 0.84 gpl iron (Fe), 10 ppm selenium (Se), 568 ppm arsenic (As), 32 ppm antimony (Sb) and 4.8 ppm bismuth (Bi). The parts per million in solution is on the basis of mg/liter of solution. Thus, 10 ppm selenium corresponds to 10 mg/liter of solution.

To 900 ml (milliliter) of solution is added 100 ml of 6% $SO_2$ solution in an autoclave. The solution is heated to 170° C at 90 psig and temperature after 13 minutes being 180° C at 110 psig.

The solution was cooled, removed from the autoclave and filtered to separate the residue from the solution. The solution (1000 ml) assayed 32 gpl Cu, 38.6 gpl Ni, 0.76 gpl Fe, less than 1 ppm Se, 469 ppm As, 24 ppm Sb and 50 ppm Bi.

The residue or precipitate recovered for the next treatment step amounted to 3.18 grams and contained 3352 ppm of selenium on the weight basis or 0.00335 gram per million grams. This corresponds to about 3.35 mg per gram of residue or approximately 10 mg of selenium total in the residue. This corresponds to about 26 mg of $Cu_2Se$. Thus, the ratio of $Cu_2Se$ to Cu in the residue is approximately 0.009:1.

The residue is then treated as in Example 1 by adding thereto a copper sulfate solution and sufficient sulfuric acid at least chemically equivalent to the copper in the residue to yield a slurry about 10% pulp density. Air is bubbled into the solution at about 85° C to oxidize the copper and dissolve it as copper sulfate, with the $Cu_2Se$ remaining in the residue.

The invention is particularly applicable to copper sulfate solutions containing over 3 ppm and generally from about 10 to 100 ppm of selenium. Such solutions may contain 20 to 150 grams of copper per liter as copper sulfate, from 0 to 70 grams/liter of nickel as nickel sulfate, about 5 to 250 grams/liter of free sulfuric acid, 0 to 5 grams/liter of iron and at least one other impurity capable of being precipitated with iron, such as arsenic, bismuth and the like.

The invention is also applicable to the separation of metallic copper from a precipitate containing a mixture of $Cu_2Se$ and Cu powder. Such precipitates may contain $Cu_2Se$ relative to metallic copper in weight ratios of $Cu_2Se$:Cu ranging from about 0.002:1 to 1:1 or, preferably, in the range of about 0.005:1 to 0.5:1.

Where a precipitate of the foregoing type is being treated for the selective solution of the copper powder, it is essential that free sulfuric acid be present in an amount at least stoichiometrically sufficient to combine with oxidized copper. Thus, a water slurry is produced from the precipitate, the water containing sulfuric acid. It is desirable that copper sulfate be present as a catalyst in an amount corresponding to at least 10 grams/liter and ranging up to 100 grams/liter.

The solution is heated to a temperature in the range of about 50° C to 90° C and air or oxygen bubbled in the solution to effect oxidation of the copper and its dissolution in the form of copper sulfate. The residue is thereafter separated by filtration and washed, the wash water combined with the copper solution then being sent to copper recovery.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the intention and the appended claims.

What is claimed is:

1. A method for treating a copper-containing sulfuric acid solution to produce a purified copper sulfate solution for electrowinning copper therefrom, wherein selenium contained therein is removed from solution containing iron and at least one other impurity selected from the group consisting of arsenic, antimony and bismuth precipitatable with the iron which comprises, adjusting the pH of said acid copper solution and maintaining said solution in the acid state at a pH of at least about 3, aerating said adjusted acid solution to precipitate said iron as $Fe(OH)_3$ and said at least one other impurity selected from said group, said selenium staying in solution, filtering the precipitated impurities from said solution, and then subjecting said solution to $SO_2$ under pressure at a temperature of about 110° C to 170° C and a pressure of about 10 to 100 psi gage to remove substantially all of said selenium from solution as $Cu_2Se$ together with some metallic copper, thereby forming a purified copper sulfate solution, with the $Cu_2Se$-Cu precipitate forming a residue which is thereafter separated from the solution.

2. The method of claim 1, wherein the $Cu_2Se$-Cu precipitate produced has a ratio of $Cu_2Se$ to Cu ranging from about 0.002:1 to 0.5:1.

3. The method of claim 1, wherein the pH is adjusted over a range of about 3 to 4.5, and wherein the solution prior to precipitation contains over 3 ppm selenium.

4. The method of claim 3, wherein the copper is selectively dissolved from the residue in the presence of copper sulfate and free $SO_4$ ions at least stoichiometrically equivalent to the copper in the residue in an aqueous solution while aerating said solution, and wherein after dissolution of the copper, the residue comprises essentially said $Cu_2Se$ and said solution comprises essentially copper sulfate.

* * * * *